United States Patent Office 3,276,956
Patented Oct. 4, 1966

3,276,956
TREATING INFECTIONS IN POULTRY CAUSED BY PLEUROPNEUMONIA-LIKE ORGANISMS WITH ERYTHROMYCIN PHOSPHATE
Earl Victor Cardinal, Lake Bluff, Ill., assignor to Abbott Laboratories, North Chicago, Ill., a corporation of Illinois
No Drawing. Filed May 31, 1963, Ser. No. 284,343
1 Claim. (Cl. 167—53.1)

This invention relates to a novel, water soluble salt of erythromycin and more specifically to erythromycin phosphate per se as well as to stable, aqueous compositions containing the same which are useful in the treatment of pleuropneumonia-like organisms in fowl.

Many acid-addition salts of erythromycin are known. However, these salts are either unstable in water or so insoluble in water that they are always employed with a non-aqueous or solid carrier when administered orally or in the alternative, reconstituted with a suitable liquid just prior to injection. One of the major problems of the poultry farmer is the treatment of his flocks, especially chickens, to counteract the devastating losses due to pleuropneumonia-like organisms. Such organisms are susceptible to erythromycin but it is impractical to treat each bird individually—i.e., by injection. In the past, various erythromycin derivatives have been incorporated into the feed but stability is a serious problem and oftentimes the birds will not eat the medicated feed. It thus became apparent that the most sensible approach to the problem was to develop an erythromycin derivative which could be administered to poultry in the drinking water. The investigation of several hundred known salts of erythromycin for this purpose soon led to the conclusion that the solution to the problem was not simple. Erythromycin base was not sufficiently soluble in water to be effective as a medicament. The stearate and thiocyanate were even less soluble in water than the erythromycin base and thus less effective. Such salts as erythromycin sulfate, sulfamate, hydrochloride and lactobionate were found to be sufficiently soluble in water but decomposed too rapidly or were too expensive to be practical. A search was then begun for a new, inexpensive, non-toxic, erythromycin salt which would possess the requisite water solubility and stability properties for use as an antibiotic in poultry drinking water.

It has now been discovered that the hitherto undescribed phosphoric acid salt of erythromycin possesses a unique combination of inherent properties which makes said salt admirably suitable for use against PPLO infections when incorporated into the drinking water of poultry. This compound is a white solid soluble in water to the extent of at least 5 grams per 100 ml. and melts at about 145° C. when spray dried or lyophilized. Aqueous solutions containing from 250 to 500 mg. of erythromycin phosphate per 30 ml. of water are extremely stable and at most lose only 10% of their antibiotic activity after 6 days at ambient temperature. Furthermore, the phosphate is cheaper to produce than the sulfamate or lactobionate and will not plug the proportioners employed to dispense the medicated drinking water to poultry.

The preparation of erythromycin phosphate and a typical formulation containing the same are set forth in the following examples which are presented as illustrative only.

EXAMPLE 1

Erythromycin base (340 grams, 0.46 mole) was dissolved in 500 ml. of methanol and to the resulting solution was added dropwise with vigorous stirring 52 grams (0.52 mole) of an aqueous solution containing 85% by weight of phosphoric acid. The reaction mixture was then filtered and the filtrate spray dried to obtain the desired erythromycin phosphate as a white solid which melted at 145° C.

EXAMPLE 2

Forty grams (0.054 mole) of erythromycin base was suspended in 500 ml. of water and an equimolar amount of phosphoric acid in the form of a 10% aqueous solution was added slowly with vigorous agitation until the pH of the reaction mixture was 6.0. The resulting solution was lyophilized to obtain the erythromycin phosphate as an amorphous, white solid which melted at 145° C. and was soluble to the extent of 5 grams per 100 ml. of water.

If desired, acetone or isopropyl alcohol or aqueous mixtures thereof can be employed as the reaction medium in the preparation of erythromycin phosphate with good results but methanol is the preferred solvent since the product is very soluble therein.

EXAMPLE 3

*Dry formulation containing erythromycin phosphate*

| Ingredient: | Amount in grams |
|---|---|
| Erythromycin phosphate | 149.47 |
| Sodium citrate | 111.11 |
| Cane sugar | 737.73 |
| Red Dye, F.D. & C. #2 | 1.67 |

Charge the blender with all of the sodium citrate and erythromycin phosphate, mix 5 minutes and dump. Mill through a #10 mesh sieve about ¼ of the sugar into the blender. Mix the dye with a small portion of the citrate-phosphate mixture and mill through a #60 mesh sieve into the blender. Mill 5 grams of sugar through the same sieve into the blender. Mill the balance of the citrate-phosphate mixture into the blender and mix for 15 minutes. Mill the rest of the sugar through a #10 mesh screen into the blender and mix all the ingredients for one hour. The resulting blend is readily soluble to the extent of 500 mg. of erythromycin per 30 ml. of water and can be readily proportioned as an aqueous solution to treat PPLO infections in poultry. This solution will retain its antibiotic potency for at least six days at 25° C.

I claim:
In the method of counteracting devastating losses due to pleuropneumonia-like infection in flocks of poultry, especially chickens, which are caused by pleuropneumonia-like organisms susceptible to erythromycin, wherein erothromycin salts which are soluble in water than erythromycin base are incorporated into the poultry drinking water and the medicated drinking water is dispensed to the poultry, the improvement which consists essentially of the steps of (a) proportioning as an aqueous solution containing from 250 mg. to 500 mg. of erythromycin phosphate per 30 ml. of water into the poultry drinking water, to thereby obtain an extremely stable aqueous medicated poultry drinking water solution which at the most loses only 10% of antibiotic activity after 6 days at ambient temperature, and (b) dispensing the medicated drinking water to poultry to treat pleuropneumonia-like infections in poultry which are caused by pleuropneumonia-like organisms susceptible to erythromycin.

References Cited by the Examiner

UNITED STATES PATENTS

| 2,653,899 | 9/1953 | Bunch et al. | 260—210 |
| 2,830,982 | 4/1958 | Stainbrook et al. | 260—210 |
| 2,885,321 | 5/1959 | Hollis | 167—53.1 |
| 2,894,943 | 7/1959 | Nelson et al. | 260—210 |
| 2,925,342 | 2/1960 | Sherman et al. | 99—2 |
| 2,993,833 | 7/1961 | Stephens | 167—55 |
| 3,137,619 | 6/1964 | Kueter | 167—53 |

(Other references on following page)

FOREIGN PATENTS 827,548  2/1960  Great Britain.

OTHER REFERENCES

Calet, Ann. Inst. Nat'l. Recherche Agron. Ser. D-9, pp. 185–193 (1960); abstracted in Chem. Abstracts 55: 6629b (1961).

Celmer et al., Antibiotics Annual, 1957–1958, pp. 476–483.

Goldberg, "Antibiotics: Their Chemistry and Non-Medical Uses," pp. 4–6, 96–97, 101–108, 176–177, 180–182, 187–194, 201, 205–207, published 1959, by D. Van Nostrand Co., Inc., Princeton, N.J.

Hamdy et al., Poultry Science 36: 748–754 (1957); abstracted in Chem. Abstracts 52: 2251e (1958).

Hinton et al., Antibiotics and Chemotherapy 9: 667–671 (1959).

Lassiter et al., J. Dairy Science 42: 1712–1717 (1959); abstracted in Chem. Abstracts 54: 5851a (1960).

McGinnis, et al., Poultry Science 37: 810–813 (1958); abstracted Chem. Abstracts 53: 20326 g (1959).

Miller, Pfizer Handbook of Microbial Metabolites, pp. 20, 118–122, 136–138, published 1961 by McGraw-Hill, N.Y.

LEWIS GOTTS, *Primary Examiner.*

SHEP K. ROSE, *Assistant Examiner.*